United States Patent
Zhang et al.

(10) Patent No.: US 11,050,492 B1
(45) Date of Patent: Jun. 29, 2021

(54) SUBSPACE-BASED BLIND IDENTIFICATION ALGORITHM OF OCEAN UNDERWATER ACOUSTIC CHANNEL FOR MULTI-CHANNEL FIR FILTER

(71) Applicant: Institute of Oceanology, Chinese Academy of Sciences, Qingdao (CN)

(72) Inventors: Xiangguang Zhang, Qingdao (CN); Jianing Wang, Qingdao (CN); Fan Wang, Qingdao (CN)

(73) Assignee: Institute of Oceanology, Chinese Academy of Sciences, Qingdao (CN)

( * ) Notice: Subject to any disclaimer, the term of this patent is extended or adjusted under 35 U.S.C. 154(b) by 0 days.

(21) Appl. No.: 17/003,782

(22) Filed: Aug. 26, 2020

(30) Foreign Application Priority Data

Jan. 15, 2020 (CN) .......................... 202010043424.1

(51) Int. Cl.
*H04B 13/02* (2006.01)
*H04L 25/02* (2006.01)

(52) U.S. Cl.
CPC .......... *H04B 13/02* (2013.01); *H04L 25/0212* (2013.01)

(58) Field of Classification Search
CPC .... H04B 10/6971; H04B 7/0845; H04B 1/40; H04B 10/25073; H04B 10/697; H04B 10/6972; H04B 15/00; H04B 1/1638; H04B 7/005; H04B 13/02; H04L 2025/03636; H04L 25/0212; H04L 25/0042; H04L 2025/03675; H04L 25/0305; H04L 25/03292; H04L 25/0228; H04L 25/022; H04L 25/0238; H04L 25/03828; H04L 27/2695; H04L 1/0045; H04L 2025/03617; H04L 2027/0038; H04L 25/0204; H04L 25/03261; H04L 25/03267; H04L 25/061; H04L 27/3405; H04L 27/36
USPC ..... 455/286, 299, 306–307, 339, 213, 67.11, 455/9, 226.1, 226.3, 10, 500–506, 455/423–425; 375/350, 224, 227, 229
See application file for complete search history.

(56) References Cited

U.S. PATENT DOCUMENTS

| | | | | |
|---|---|---|---|---|
| 5,940,440 A | * | 8/1999 | Werner ............... | H04L 25/0305 375/231 |
| 6,668,014 B1 | * | 12/2003 | Endres ................ | H04L 25/0307 375/224 |
| 7,027,500 B1 | * | 4/2006 | Casas .................. | H04L 25/0307 348/607 |

(Continued)

OTHER PUBLICATIONS

E. Moulines, P. Duhamel, J. Cardoso, and S. Mayrargue, "Subspace Methods for the Blind Identification of Multichannel FIR Filters", 1995, IEEE Transactions on Signal Processing, vol. 43, issue: 2, pp. 516-525. (Year: 1995).*

(Continued)

*Primary Examiner* — Lana N Le
(74) *Attorney, Agent, or Firm* — Polsinelli PC

(57) ABSTRACT

The disclosure provides a subspace-based blind identification algorithm of an ocean underwater acoustic channel for multi-channel fir filter, which adopts a technical solution that a channel impulse response coefficient is calculated by quadratic minimization. The disclosure has beneficial effects that estimation precision can be met when using a proper number of samples, and especially when a few noise vectors are used for estimating channel parameters, so that calculation amount is greatly reduced.

1 Claim, 4 Drawing Sheets

(56) References Cited

U.S. PATENT DOCUMENTS

| | | | | |
|---|---|---|---|---|
| 7,283,790 | B2 * | 10/2007 | Chevalier | H04L 25/0204 375/224 |
| 7,349,469 | B1 * | 3/2008 | Touzni | H04L 25/03063 375/232 |
| 7,787,571 | B2 * | 8/2010 | Ferreol | H04L 25/0238 375/324 |
| 8,135,101 | B2 * | 3/2012 | Bui | H04L 25/0244 375/350 |
| 8,335,440 | B2 * | 12/2012 | Krause | H04L 25/0305 398/208 |
| 8,666,262 | B2 * | 3/2014 | Yan | H04L 25/0305 398/209 |
| 9,008,154 | B2 * | 4/2015 | Xu | H04B 1/711 375/148 |
| 2003/0016770 | A1 * | 1/2003 | Trans | H04L 1/0054 375/346 |
| 2004/0120274 | A1 * | 6/2004 | Petre | H04L 1/0675 370/320 |
| 2006/0268923 | A1 * | 11/2006 | Wu | H04L 25/0212 370/441 |
| 2006/0268972 | A1 * | 11/2006 | Wu | H04L 25/0212 375/229 |
| 2007/0133700 | A1 * | 6/2007 | Kim | H04L 25/0238 375/260 |
| 2007/0195904 | A1 * | 8/2007 | Kemenczy | H04L 25/0328 375/262 |
| 2007/0217496 | A1 * | 9/2007 | Molev-Shteiman | H04L 1/005 375/229 |
| 2011/0261867 | A1 * | 10/2011 | Hu | H04L 25/0252 375/224 |
| 2015/0180537 | A1 * | 6/2015 | Garmany | H04L 25/03159 375/232 |

OTHER PUBLICATIONS

J. Fang, A. R. Leyman and Y. H. Chew, "A subspace projection method for blind identification using shifted correlation matrices," 2004, IEEE 5th Workshop on Signal Processing Advances in Wireless Communications, pp. 527-531. (Year: 2005).*

* cited by examiner though the sources of the signals are unknown, which get an analytical solution of the blind identification problem and are a representative kind of blind equalization method based on second-order statistics.

SUBSPACE-BASED BLIND IDENTIFICATION ALGORITHM OF OCEAN UNDERWATER ACOUSTIC CHANNEL FOR MULTI-CHANNEL FIR FILTER

CROSS REFERENCE TO RELATED APPLICATION

This application claims the priority of Chinese Patent Application No. 202010043424.1, entitled "Subspace-based Blind Identification Algorithm of Ocean Underwater Acoustic Channel for Multi-channel FIR Filter" filed with the Chinese Patent Office on Jan. 15, 2020, which is incorporated herein by reference in its entirety.

TECHNICAL FIELD

The disclosure relates to the technical field of communication, in particular to a subspace-based blind identification algorithm of an ocean underwater acoustic channel for a multi-channel FIR filter.

BACKGROUND

In a traditional equalization algorithm, an equalizer is designed by sending training sequences or applying priori knowledge to achieve equalization. However, for mobile underwater communication equipments, it is often difficult to extract information accurately by using the traditional equalization algorithm due to position change between communicating parties, so that the communicating parties can not communicate normally. Therefore, it is very important to study blind channel identification or blind channel equalization of underwater acoustic channel. Traditional blind equalization algorithms generally use the characteristics of the signal to propose a cost function, and then use various gradient algorithms for blind identification and blind equalization. Channel identification of MIMO (Multi-input Multi-output) system plays an important role in multi-channel communication system, and can be used to eliminate inter-symbol interference (ISI) in digital signals. The channel identification of MIMO system can complete signal recovery with ensuring the independence of multiple sources. At present, there are mainly two kinds of methods for channel identification, the first kind is a method based on Second-Order Statistics (SOS) for realizing the identification of the system based on the second-order moment of observed signals. The implementation of the method is simple, has closed solution at some cases, requires less data, and can be used to processes Gaussian distributed input signals. However, the SOS method has certain requirements on signals and channels, wherein phase attributes of the channels cannot be obtained according to received signals. The other kind is High-Order Statistics (HOS) method, which carries out channel identification by utilizing high-order moment or high-order spectrum of the observed signals. For the HOS method, at most one signal among input signals can be a Gaussian signal, and a large amount of signal data are to be collected to obtain better high-order statistics. A waveform of the underwater acoustic signal can be recovered and a signal-to-noise ratio of the communication signal can be improved by studying the blind channel identification. In recent years, many estimation methods in the research field of the blind equalization are studied as subspace methods by utilizing mutual orthogonality between signal subspace and noise subspace. The methods have an advantage of obtaining

SUMMARY

The disclosure intends to provide a subspace-based blind identification algorithm of an ocean underwater acoustic channel for a multi-channel fir filter, which has beneficial effects that estimation precision can be met when using a proper number of samples, and especially when a few noise vectors are used for estimating channel parameters, so that calculation amount is greatly reduced.

The technical solution adopted by the disclosure comprises:

calculating a channel impulse response coefficient by quadratic minimization according to formula (16):

$$q(h) = K|h|^2 - \sum_{i=0}^{L+K-1} |\hat{s}_i^H H_K|^2 = K|h|^2 - h^H \left( \sum_{i=0}^{L+K-1} \hat{s}_j \hat{s}_j^H \right) h = K|h|^2 - h^H \tilde{Q} h, \quad (16)$$

wherein $\hat{s}_i$ represents an M(L+1)×(L+K) filter matrix corresponding to an eigenvector $$\hat{S}_i, \tilde{Q} = \sum_{i=0}^{L+K-1} \hat{s}_i \hat{s}_i^H;$$

establishing a formula (17) under a constraint of $\|h\|^2=1$:

$$\tilde{q}(h) = h^H \tilde{Q} h \quad (17);$$

solving a maximum eigenvalue of $\tilde{Q}$ which makes the formula (17) maximized;

estimating a correlation matrix $R_x$ by replacing an overall average of the correlation matrix of communication signals with a sample estimation due to the overall average of the correlation matrix of communication signals being unknown in actual communication, wherein $$R_x = \frac{1}{KM} \sum_{i=0}^{KM-1} \tilde{X}_i \tilde{X}_i^H,$$

and $\tilde{X}_i$ represents an observed sample value;

eigenvalue decomposition: decomposing the correlation matrix $R_x$ into a form of formula (8):

$$R_x = S \mathrm{diag}(\lambda_0, \lambda_1, \ldots \lambda_{L+K-1}) S^H + \sigma^2 G G^H \quad (8);$$

wherein, columns of matrix S are expanded into signal subspaces, and columns of matrix G are expanded into noise subspaces; and a calculation of a quadratic form: solving min[q(h)]=min [$h^T Q h$] according to formula (15), i.e., solving min($Q_i$)=min ($\hat{g}_i \hat{g}_i^H$), wherein h=$Q^{-1}$c.

DETAILED DESCRIPTION

Hereinafter, the disclosure will be described in detail with reference to specific embodiments.

1. Blind Identification Model of Multi-Channel FIR Filter

It is assumed that discrete signals transmitted by a signal source are s(k), signals observed after s(k) have been transmitted through channels, filtered and processed are defined as x(k), an impulse response of the channel is h(k) including comprehensive characteristics of transmission, reception, processing of channel and the like, h(k) is linear, and a noise n(k) superimposed during transmission is a band-limited stationary process.

The subspace method relies on two assumptions that: (1) the channel impulse response h(k) has a finite support, i.e. the channel can be represented by an FIR filter; (2) multiple measurements are possible within a character transmission period T.

Figure 1:
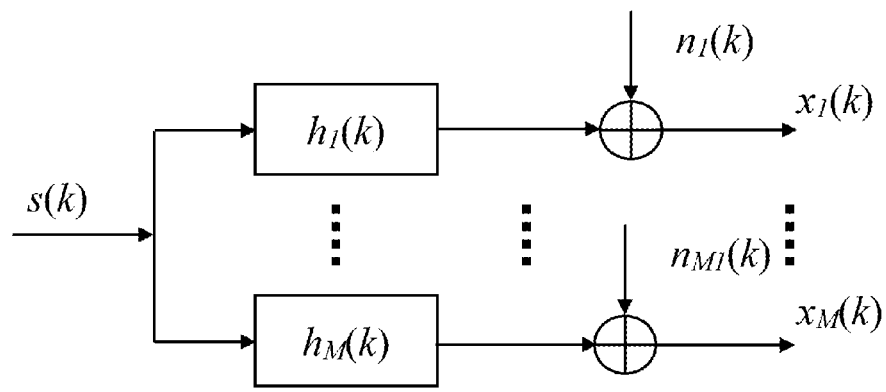
FIG. 1 shows a SIMO system model.

There are several methods to implement multiple measurements, one of which is adopting multiple sensors to sample signals received by the sensors with the period T, another of which is oversampling a signal received by a single sensor, or a comprehensive application of both. Both the method adopting multiple sensors and the oversampling method adopting a single sensor are equivalent, and they are equivalent to a single-input multiple-output system, as shown in FIG. 1.

Input signal sequence {s(k)} is output through different linear channels {$h_m(k)$}, m=1, 2, . . . , M. An output of any channel can be represented as:

$$x_m(k) = h_m(k) \otimes s(k) + n_m(k)$$
$$X(k) = H(k) \otimes S(k) + N(k)$$ (1)

wherein "$\otimes$" represents convolution, $H(k)=[h_1(k), h_2(k), \ldots, h_M(k)]^T$, $X(k)=[x_1(k), x_2(k), \ldots, x_M(k)]^T$, and $N(k)=[n_1(k), n_2(k), \ldots, n_M(k)]^T$.

If the SIMO system is a finite impulse response system (FIR) with a length of L, when an observation length is K, an output of the SIMO system is:

$$X_K = H_K S_K + N_K$$ (2);

wherein each matrix in formula (2) is expressed as:

$$X_k = \begin{bmatrix} X(k) \\ \vdots \\ X(k+K-1) \end{bmatrix},$$

$$H_K = \begin{bmatrix} H(L-1) & \ldots & H(0) & \ldots & 0 \\ \vdots & \ddots & \ddots & \ddots & \vdots \\ 0 & \ldots & H(L-1) & \ldots & H(0) \end{bmatrix},$$

$$S_k = \begin{bmatrix} S(k-K+1) \\ \vdots \\ S(k+K+L) \end{bmatrix}, \text{ and } N_k = \begin{bmatrix} N(k) \\ \vdots \\ N(k+K-1) \end{bmatrix};$$

wherein $X_k$ and $N_k$ are both K×M observation signal matrices, $H_K$ is an M×K×(K+L) filter matrix, and $S_k$ is a (K+L)×1 vector.

It has been proved in Document [71] (i.e. [71] Li Y, Ding Z. Blind Channel Identification Based on Second-order Cyclosttationary statistics. ICASSP, 1993, 4:81-84.) that channel parameters of the SIMO system can be identified by using the second-order statistics output by the system, when M channels meet two following conditions:

(1) $x_{m_1}(0) \neq 0$, $h_{m_1}(L-1) \neq 0$, $1 \leq m_1$, $m_2 \leq M$; and
(2) no common zero point in $\{H_m(z)\}_1^M$, wherein $H_m(z)$ is a Z-transformation of $\{h_m(k)\}$. Thus $H_K$ in the formula (2) is full-rank for any K≥L−1.

2. Subspace-Based Blind Identification of Multi-Channel FIR Filter

The blind identification is a process of estimating the channel impulse response coefficients $H_k$ only according to the observed data $X_k$. The formula (2) can be rewritten as:

$$X_k = H_k S_k + N_k$$ (3).

The blind identification is based on an MK×MK autocorrelation matrix $R_x$ according to Tong's method (see Document [72] L. Tong, G. Xu, T. Kailath. Blind identification and equalization based on second-oreder statistics: a time domain approach. IEEE Trans. Inform. Theory, 1994, 40(3): 340-350.), i. e:

$$R_x = E(X_k X_k^H)$$ (4).

Formula (5) can be built when the formula (3) is substituted into the formula (4) due to an assumption of additive noise being independent from transmitted signal sequence:

$$R_x = H_k R_s H_k^H + R_N$$ (5), wherein $R_s = E(S_k S_k)$ and $R_N = E(N_k N_k^H)$ represents an autocorrelation matrix of a transmitted signal vector $S_k$ and that of a noise vector $N_k$ respectively. The autocorrelation matrix $R_S$ of the signal source has dimensions of (K+L)×(K+L) and is assumed to be full-rank but unknown. The noise autocorrelation matrix has dimensions of KM×KM and is assumed as $R_N = \alpha^2 I$ for simplicity, wherein a represents a variance of $N_k$, I represents a KM×KM unit matrix.

$\lambda_0 \geq \lambda_1 \geq \ldots \lambda_{KM-1}$ is assumed to be eigenvalues of $R_x$. A signal part of $R_x$, i.e. $H_k H_s H_k^H$, has a rank of K+L due to $R_s$ being full-rank, that is:

$$\begin{cases} \lambda_i > \sigma^2, i = 0, 1, \ldots, L+K-1 \\ \lambda_i = \sigma^2, i = L+K, \ldots, KM-1 \end{cases}$$ (6)

Unit eigenvectors corresponding to the eigenvalues $\lambda_0 \geq \lambda_1 \geq \ldots \lambda_{K+M-1}$ are denoted as $S_0, S_1, \ldots, S_{K+M-1}$, and unit eigenvectors corresponding to eigenvalues $\lambda_{L+K}$, $\lambda_{L+K+1}, \ldots \lambda_{MK-1}$ are denoted as $G_0, G_1, \ldots, G_{KM-(L+K)-1}$, and there is:

$$\begin{cases} S = [S_0, S_1, \ldots, S_{L+K-1}] \\ G = [G_0, G_1, \ldots, G_{KM-L-K-1}] \end{cases}$$ (7)

wherein S has dimensions of MK×(L+K) and G has dimensions of MK×(MK−L−K).

The matrix $R_x$ can then be represented as:

$$R_x = S \text{diag}(\lambda_0, \lambda_1, \ldots \lambda_{L+K-1}) S^H + \sigma^2 G G^H \quad (8);$$

Wherein columns of matrix S are expanded into signal subspaces and columns of matrix G are expanded into noise subspaces. The noise subspace is an orthocomplement of the signal subspace, and the signal subspace is also a linear space expanded from columns of a filter $H_K$. It can be known from the orthogonality of the noise and signal subspaces that the columns of the filter matrix $H_K$ are orthogonal to any vector within the noise subspaces, which can be represented as:

$$G_i^H H_K = O, 0 \leq i \leq MK-L-K \quad (9).$$

Although the formula (9) is a linear equation with unknown coefficients, it provides a simple method for blind channel identification. The impulse response coefficients of channels can be uniquely determined by the noise subspace under a condition of at most one constant gain difference with appropriate conditions in the following theorem 1.

Theorem 1: assuming that K≥L, a matrix $H_{K-1}$ is column full rank (i.e., rank($H_{K-1}$)=L+K−1), and $H'_K$ is a non-zero filter matrix with same dimensions as $H_K$, a necessary and sufficient condition that a numerical range of $H'_K$ is included within a numerical range of $H_K$ is that $H'_K$ is proportional to $H_K$.

The theorem 1 provides a method for estimating channel parameters, wherein the identification of channels depends on a particular structure of $H_K$ under a condition that $R_s$ is unknown and full-rank.

3. Subspace-Based Parameter Estimation

Orthogonal condition formula (9) is a linear function of channel coefficient, but in practice only a sample estimation $\hat{G}_i$ of the noise eigenvectors can be used for parameter estimation, so that formula (9) should be solved only in the least square sense. A quadratic cost function is defined as below:

$$q(h) \stackrel{def}{=} \sum_{i=1}^{MK-L-K-1} \left\| \hat{G}_i^H H_K \right\|^2. \quad (10)$$

It is easily derived from the following lemma 1 that q(h) depends on h rather than $H_K$. To this end, the following symbols are introduced, and the structures of h and $H_K$ are the same therewith.

It is assumed that $v^{(0)}, v^{(1)}, \ldots, v^{(M-1)}$ are M arbitrary K×1 vectors, denoted as MK×1 vectors of $v=[v^{(0)}, v^{(1)}, \ldots, v^{(M-1)}]^T$, following symbols, defined as an (L+1)×(L+K) filter matrix $V_{L+1}^{(l)}$, are introduced as:

$$V_{L+1}^{(l)} = \begin{bmatrix} v_0^{(l)} & v_1^{(l)} & \ldots & v_{K-1}^{(l)} & 0 & \ldots & 0 \\ 0 & v_0^{(l)} & v_1^{(l)} & \ldots & v_{K-1}^{(l)} & 0 & \ldots \\ \vdots & & & \ldots & & & \vdots \\ 0 & \ldots & 0 & v_0^{(l)} & v_1^{(l)} & \ldots & v_{K-1}^{(l)} \end{bmatrix}; \quad (11)$$

wherein $V_{L+1}$ is an M(L+1)×(L+K) matrix formed by stacking M filter matrices $V_{L+1}^{(l)}$, (l=0, 1, . . . M−1), and defined as:

$$V_{L+1} = [V_{L+1}^{(0)T}, V_{L+1}^{(1)T}, \ldots V_{L+1}^{(M-1)T}]^T \quad (12).$$

Lemma 1: the following structural relationship holds:

$$v^T H_K = h^T V_{L+1} \quad (13).$$

Obviously, the Lemma 1 holds because $H_K$ and $V_{L+1}$ are row full rank and the number of columns of $v^T$ and that of $h^T$ are equal to the number of rows of $H_K$ and $V_{L+1}$. According to the Lemma 1, a quadratic norm of a vector $\hat{G}_i^H H_K$ is defined as:

$$\|\hat{G}_i^H H_K\|^2 = \hat{G}_i^H H_K \hat{G}_i = h^H \hat{g}_i \hat{g}_i^H h \quad (14);$$

where $\hat{g}_i$ is an M(L+1)×(L+K) filter matrix corresponding to a vector $\hat{G}_i$. The formula (10) may be represented as:

$$q(h) = h^T Q h, \quad Q = \sum_{i=0}^{MK-L-K-1} \hat{g}_i \hat{g}_i^H. \quad (15)$$

According to the Theorem 1, if the quadratic form is constructed from an actual correlation matrix, then an actual channel impulse response coefficient is unique and therefore q(h)=0. Conversely, if only an estimated covariance matrix is available, a rank of the quadratic form is not equal to M(L+1)−1. Therefore, a nontrivial solution h can be solved out by minimizing the cost function q(h) under appropriate conditions. Typical constraints can be linear constraint and quadratic constraint.

The quadratic constraint minimizes q(h) under a constraint of ||h||=1, to solve out a eigenvector corresponding to a minimum eigenvalue of the matrix Q as a solution. The quadratic form has a large calculation amount, but has a good stability.

The linear constraint solves variable h of min[q(h)] under a constraint of $c^H h=1$, wherein c is an M(L+1)×1 vector. The solution at this point is proportional to $Q^{-1}c$. The linear constraint has a relatively simple calculation, but has a poor stability due to a possibility of Q being singular.

4. Implementation of the Algorithm

The channel impulse response coefficients can be calculated by quadratic minimization. The quadratic form as shown in the formula (15) may be equivalently represented in a form of a series of signal subspace eigenvectors, such as:

$$q(h) = \quad (16)$$

$$K|h|^2 - \sum_{i=0}^{L+K-1} \left| \hat{S}_i^H H_K \right|^2 = K|h|^2 - h^H \left( \sum_{i=0}^{L+K-1} \hat{s}_i \hat{s}_i^H \right) h = K|h|^2 - h^H \tilde{Q} h;$$

where $\hat{s}_i$ represents an M(L+1)×(L+K) filter matrix corresponding to an eigenvector $$\hat{S}_i, \tilde{Q} = \sum_{i=0}^{L+K-1} \hat{s}_i \hat{s}_i^H.$$

The minimization of the formula (10) under the constraint of ||h||²=1 is equivalent to a maximization of the following formula (17):

$$\tilde{q}(h) = h^H \tilde{Q} h \quad (17).$$

The above formula (17) can be maximized by solving a maximum eigenvalue of $\tilde{Q}$.

The quadratic form with the noise as parameter has a same solution as the quadratic form with the signal as parameter under the constraint of unit norm, however calculation amount of the latter is less than the former, since the former needs to undergo MK−L−K times of summation operations and the latter only needs to undergo L+K times of summation operations.

The theorem 1 points out that the channel impulse response coefficients can be determined by a noise subspace part of the correlation matrix $R_x$. The following inference 1 can be derived according to the theorem 1.

Inference 1: parameters of channels can be determined when only a few vectors of the noise subspace are known under appropriate conditions.

The inference 1 is illustrated and proved below. It is proved that channel parameter vector H can be identified by utilizing a vector of the noise subspace for any K>L starting from a simplest case M=2 (i.e. two channels exist).

The inference 1 can be proved according to the steps of: assuming K>L and G≠0 to be an arbitrary vector of the noise space, i.e. $G=[G^{(0)T}, G^{(1)T}]^T$ for two channels M=2. Since $G_i^H H_K=O$, 0≤i≤MK−L−K, i.e. the noise subspace is orthogonal to the column space of $H_K$, it means:

$$G^{(0)}(z)H^{(0)}(z)+G^{(1)}(z)H^{(1)}(z)=0 \quad (18);$$

where $G^{(i)}(z)$, i=0, 1 is a z-transformation of a K×1 vector $G^{(i)}$, i=0, 1. $H^{(0)}(z)$ differs from $H^{(1)}(z)$ with only one constant in Formula (18) is proven by a contradiction analytical method as follows:

It is assumed that $H'_K=[H'^{(0)T}, H'^{(1)T}]$ is a 2(L+1)×1 vector, $H'_K$ represents a 2K×(L+K) filter matrix corresponding to H'. A vector G is orthogonal to column of $H'_K$, if:

$$G^{(0)}(z)H'^{(0)}(z)+G^{(1)}(z)H'^{(1)}(z)=0 \quad (19);$$

where the condition that the formula (18) and the formula (19) cannot hold simultaneously is $G^{(0)}(z)H'^{(0)}(z)+G^{(1)}(z)H'^{(1)}(z)=0$. Since $H_K$ is assumed to be full-rank, $H^{(0)}(z)$ and $H^{(1)}(z)$ are relatively prime. With $H^{(0)}(z)$ being divided by $H'^{(1)}(z)$ and $H^{(1)}(z)$ being divided by $H'^{(1)}(z)$, and since the formula (18) and the formula (19) have the same dimensions, they must be proportional, that is:

$$\begin{cases} H^{(0)}(z) = \alpha H'^{(0)}(z) \\ H^{(1)}(z) = \alpha H'^{(1)}(z) \end{cases} \quad (20)$$

The inference 1 can be further proved in a manner similar to that described above for M≥2.

The above inference 1 shows that the channel parameter vector H may be identified by using one of vectors in the noise subspaces, which means that H can be determined by using one item in the quadratic form.

In fact, L+K linear equations including M(L+1) unknown parameters H will be generated if $G_0$ is an MK×1 vector in the noise space of matrix $R_x$, the vector $G_0$ is orthogonal to the column space of $H_K$, i.e. $G_0^H H_K=O$ or equivalently as $H^H g_0=0$, where $g_0$ is an M(L+1)×(L+K) filter matrix associated with $G_0$. There will be no unique solution since the linear system cannot be determined if L+K<M (L+1). p such linear systems can be constructed by selecting p−1 additional vectors in noise subspaces. The system may be determine if the selected p meets p(L+K)≥M(L+1). The implementation and the process of the simulation experiment of the algorithm will be illustrated hereafter.

(1) Implementation of the Algorithm

Due to an overall average of the correlation matrix of communication signals being unknown in actual communication, it is replaced with a sample estimation. A specific implementation includes a step of:

estimating the correlation matrix $R_x$, wherein $$R_x = \frac{1}{KM} \sum_{i=0}^{KM-1} \tilde{X}_i \tilde{X}_i^H,$$

and $\tilde{X}_i$ represents an observed sample value, thus $R_x$ can meet a Toeplitz structure;

eigenvalue decomposition: decomposing the correlation matrix $R_x$ into a form of formula (8); and a calculation of a quadratic form: solving min[q(h)]=min $[h^T Qh]$ according to formula (15), i.e., solving min($Q_i$)=min $(\hat{g}_i \hat{g}_i^H)$, wherein $h=Q^{-1}c$.

Simulation Experiment:

The algorithm is validated by using Monte Carlo simulation experiments. The transmitted signals adopt a series of independent 4QAM signals, and virtual channels adopt following channels:

$H^{(0)T} = [(0.049, 0.359), (0.482, -0.569),$ $(-0.556, 0.587), (1.0, 0.0), (-0.171, 0.061)]$ $H^{(1)T} = [(0.443, -0.0364), (1.0, 0.0),$ $(0.921, -0.194), (0.189, -0.208), (-0.087, -0.045)]$ $H^{(2)T} = [(-0.211, -0.322), (-0.199, 0.918),$ $(1.0, 0.0), (-0.284, -0.524), (0.136, -0.19)]$ $H^{(3)T} = [(0.417, 0.030), (1.0, 0.0),$ $(0.873, 0.145), (0.285, 0.309), (-0.049, -0.19)],$ where the number of analog channels are M=4, a width of a time window K=10, an intersymbol interference length is L=4, an additional noise is Gaussian white noise, an output signal-to-noise ratio SNR=25 dB, and the numbers of signals in simulation are respectively 250, 500, 1000, 2000, and 5000. 100 times of simulations are performed by using Monte Carlo for each simulation to calculate an average deviation and a mean square error.

(1) Average deviation: the average deviation is defined as:

$$b = \frac{1}{M(L+1)} \sum_{i=1}^{M(L+1)} |\langle H_i \rangle - H_i|,$$

wherein $\langle H_i \rangle$ represents an average of the estimated values of $H_i$ under Monte Carlo simulation, and $H_i$ represents a $i^{th}$ component of an actual parameter vector.

Figure 2:
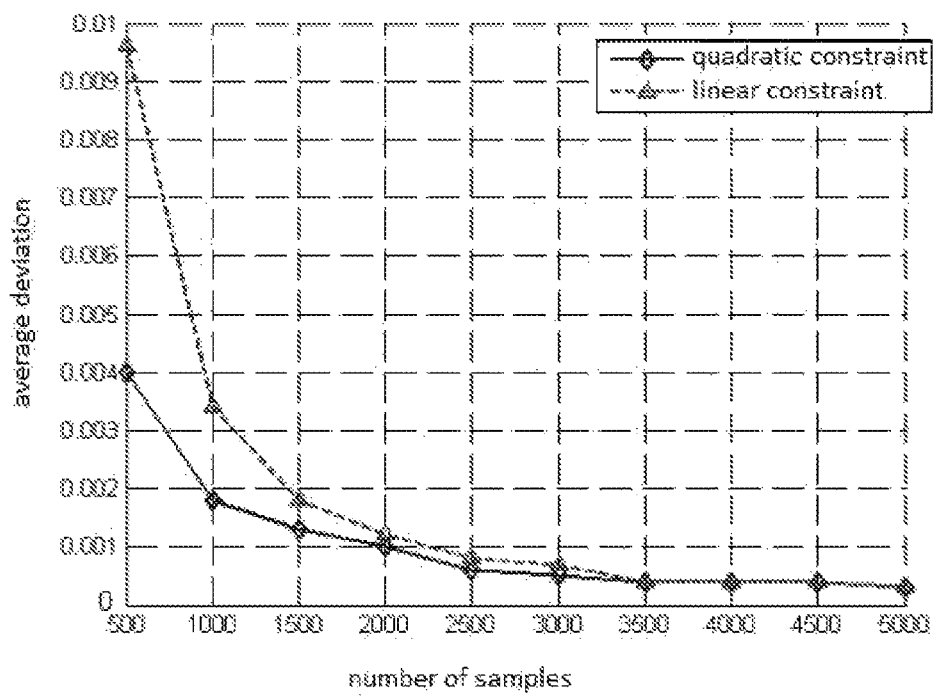
FIG. 2 shows a comparison of average deviation of parameter estimation.
Figure 3:
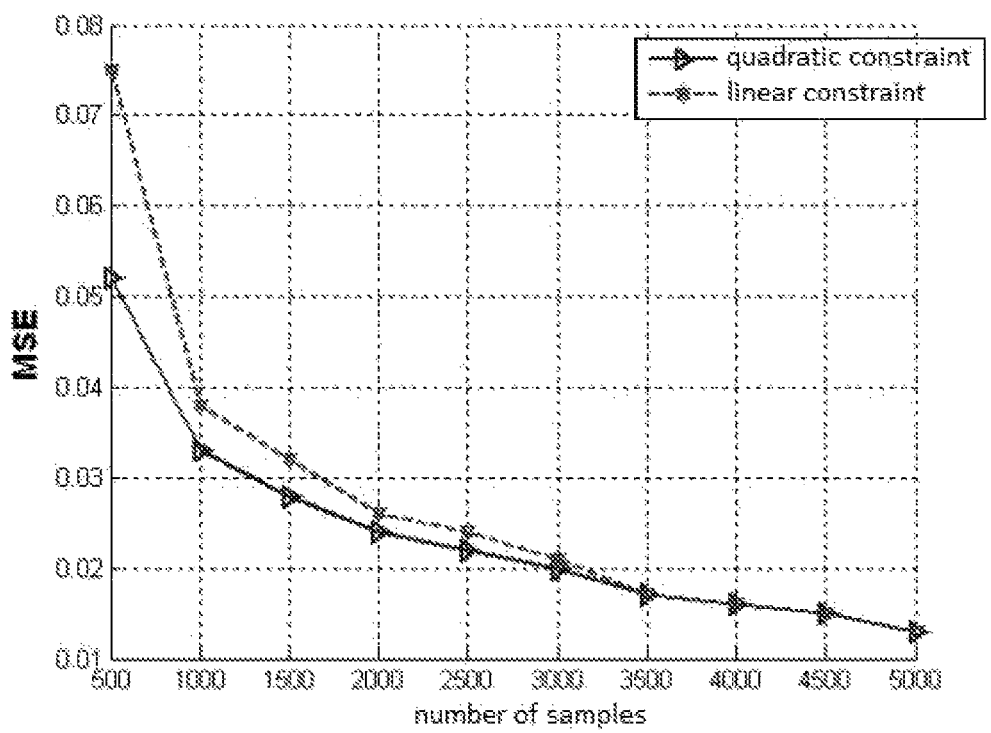
FIG. 3 shows an MSE comparison.
Figure 4:
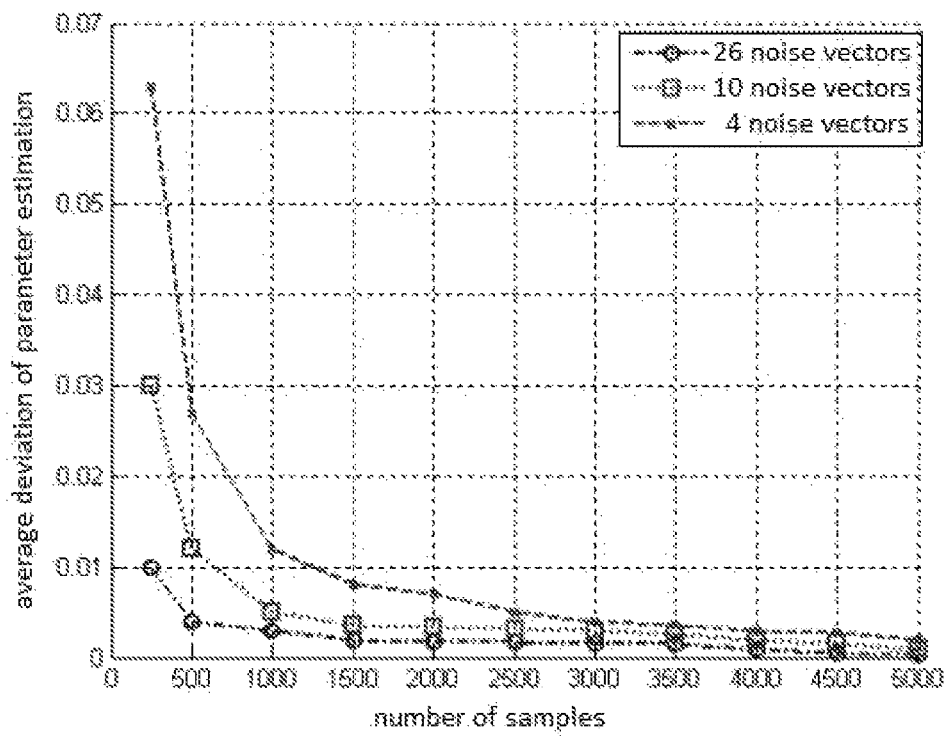
FIG. 4 shows an average deviation of parameter estimation for different noise vector spaces under quadratic constraints.
Figure 5:
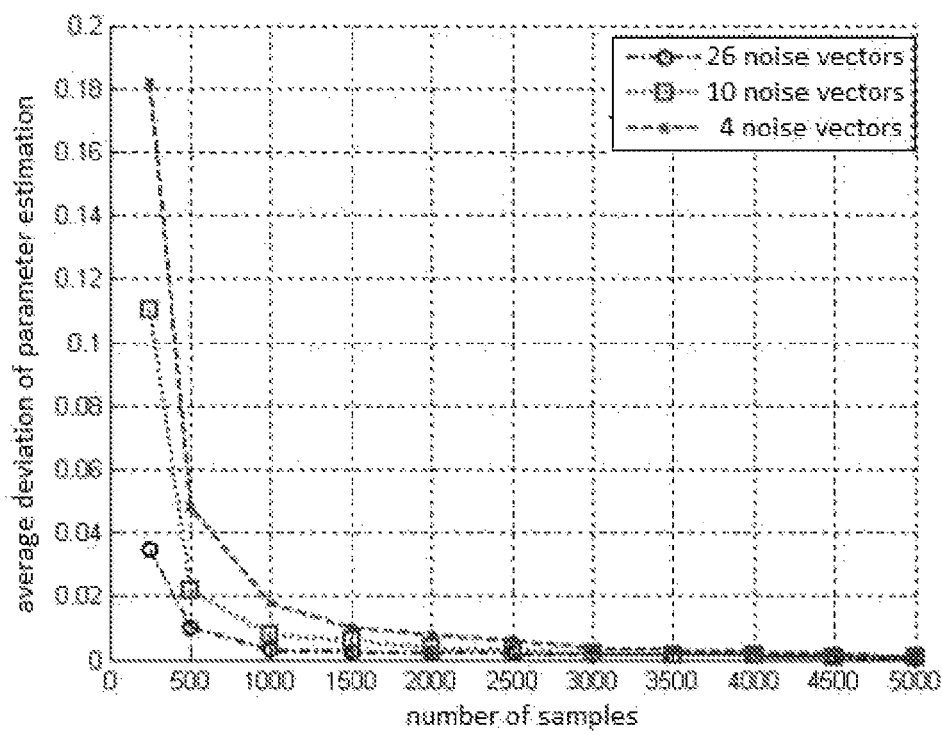
FIG. 5 shows an average deviation of parameter estimation for different noise vector spaces under linear constraints.
Figure 6:
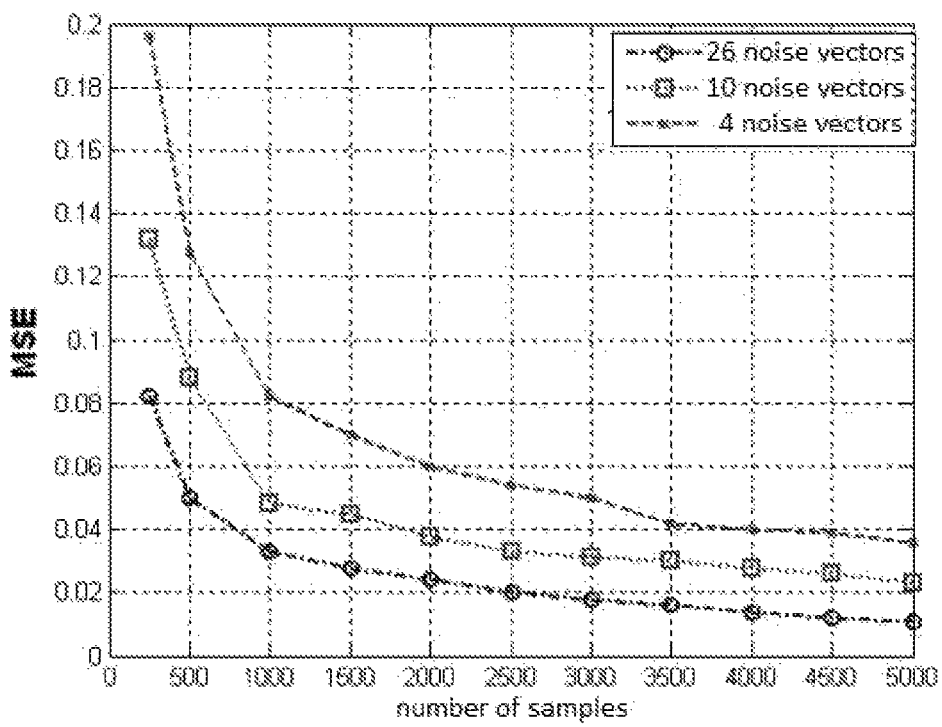
FIG. 6 shows an MSE comparison for different noise vector spaces under quadratic constraints.
Figure 7:
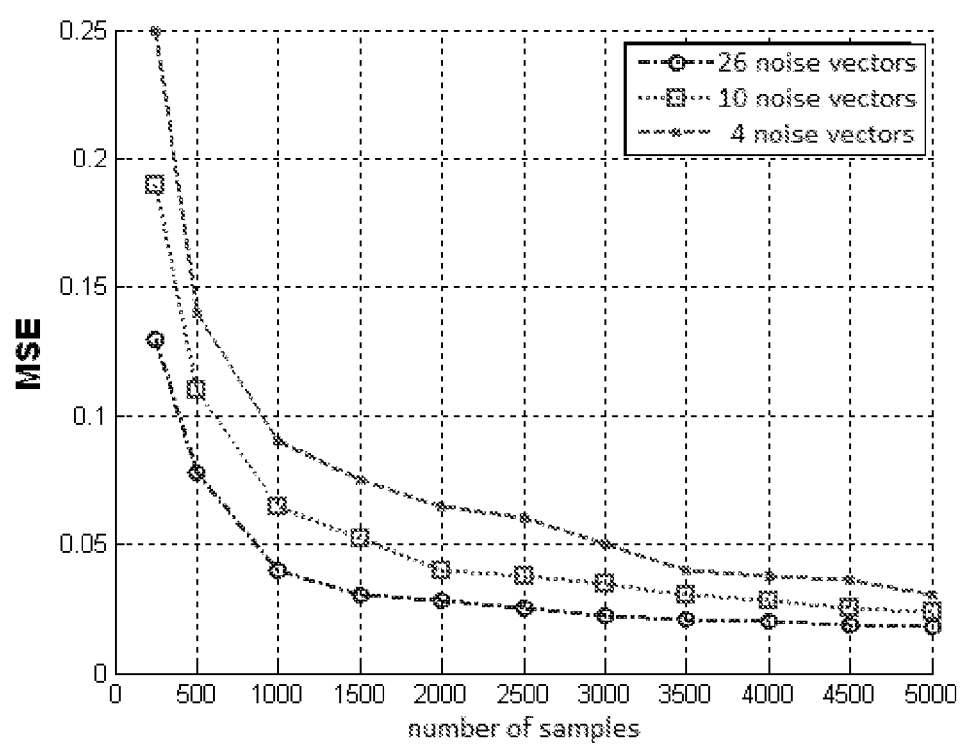
FIG. 7 shows an MSE comparison for different noise vector spaces under linear constraints.

(2) Mean square error: being defined as an average of the mean square errors for each of all unknown parameters;

(3) It can be seen from FIG. 2 that an average deviation of the channel parameter estimation calculated under the quadratic constraint is smaller than an average deviation of the parameter estimation calculated under the linear constraint, especially under a condition of less numbers of signal samples; and it can also be seen from FIG. 3 that results obtained by using MSE is same as those obtained by using average deviation;

(4) The precision of the parameters estimated by using the noise vectors is related to the number of the noise vectors, it can be seen from FIGS. 4-7 that the more the number of the noise vectors is, the higher the estimation precision is whether the linear constraint or the quadratic constraint are used. In addition, it can be observed that the precision of the estimated channel parameters is also increased when the number of signal samples is large, according to the above simulation diagram, but it doesn't mean that the precision of the estimated channel parameters will be obviously increased with an increase of the number of samples, in which the two are not of a linear relationship. It can be seen that the precision of the estimated channel parameters increases slowly and does not change significantly when the number of samples increases from 1500 to 5000, with reference to FIGS. 2-7. It shows that the estimation precision can ensured when a proper number of samples are used, especially the estimation precision can be met when only few of noise vectors are used to estimate the channel parameters, thereby reducing the amount of computation greatly.

(5) So the parameters of channels can be estimated effectively by using several noise vectors, under a condition of an appropriate number of samples, which fully demonstrates correctness and feasibility of the inference 1.

The foregoing is only exemplary embodiments of the disclosure which is not intended to limit the disclosure in any way. Any simple amendments, equivalent variations and modifications of the embodiments according to the technical spirit of the disclosure are within the scope of the technical solution of the disclosure.

The invention claimed is:

1. A subspace-based blind identification algorithm of an ocean underwater acoustic channel for multi-channel FIR filter, comprising:

calculating a channel impulse response coefficient by quadratic minimization according to a formula (16):

$$q(h) = K|h|^2 - \sum_{i=0}^{L+K-1} |\hat{s}_i^H H_K|^2 = K|h|^2 - h^H \left( \sum_{i=0}^{L+K-1} \hat{s}_i \hat{s}_i^H \right) h = K|h|^2 - h^H \tilde{Q} h, \quad (16)$$

wherein $\hat{s}_i$ represents an M (L+1)×(L+K) filter matrix corresponding to an eigenvector $$\hat{S}_i, \tilde{Q} = \sum_{i=0}^{L+K-1} \hat{s}_i \hat{s}_i^H;$$

establishing a formula (17) under a constraint of $\|h\|^2=1$:

$$\tilde{q}(h)=h^H \tilde{Q} h \quad (17);$$

solving a maximum eigenvalue of $\tilde{Q}$ which makes the formula (17) maximized;

estimating a correlation matrix $R_x$ by replacing an overall average of the correlation matrix of communication signals with a sample estimation due to the overall average of the correlation matrix of communication signals being unknown in actual communication, wherein $$R_x = \frac{1}{KM} \sum_{i=0}^{KM-1} \tilde{X}_i \tilde{X}_i^H,$$

and $\tilde{X}_i$ represents an observed sample value;

eigenvalue decomposition: decomposing the correlation matrix $R_x$ into a form of formula (8):

$$R_x = S\text{diag}(\lambda_0, \lambda_1, \ldots \lambda_{L+K-1})S^H + \sigma^2 GG^H \quad (8);$$

wherein, columns of matrix S are expanded into signal subspaces, and columns of matrix G are expanded into noise subspaces; and a calculation of a quadratic form: solving $\min[q(h)]=\min[h^T Q h]$ according to formula (15), and solving $\min(Q_i)= \min(\hat{g}_i \hat{g}_i^H)$, wherein $h=Q^{-1}c$.

* * * * *